United States Patent
Chapman (10) Patent No.: US 7,309,177 B2
(45) Date of Patent: Dec. 18, 2007

(54) CAMERA RISER WITH UNIVERSAL CENTERING RING

(75) Inventor: Leonard T. Chapman, North Hollywood, CA (US)

(73) Assignee: Chapman/Leonard Studio Equipment, Inc., North Hollywood, CA (US)

(*) Notice: Subject to any disclaimer, the term of this patent is extended or adjusted under 35 U.S.C. 154(b) by 288 days.

(21) Appl. No.: 11/114,910

(22) Filed: Apr. 25, 2005

(65) Prior Publication Data

US 2006/0239679 A1    Oct. 26, 2006

(51) Int. Cl.
*G03B 17/00* (2006.01)
(52) U.S. Cl. .................... 396/419; 396/428
(58) Field of Classification Search .......... 396/419, 396/428; 248/178.1, 187.1; 352/243
See application file for complete search history.

(56) References Cited

U.S. PATENT DOCUMENTS

| | | | | |
|---|---|---|---|---|
| 3,836,932 A | * | 9/1974 | Lohl et al. | 396/441 |
| 4,779,833 A | * | 10/1988 | Fletcher et al. | 248/550 |
| 4,950,126 A | * | 8/1990 | Fabiano et al. | 414/590 |
| 5,775,816 A | * | 7/1998 | Baranek et al. | 384/278 |
| 5,816,552 A | * | 10/1998 | Chapman | 248/281.11 |
| 6,086,207 A | * | 7/2000 | Chapman | 352/243 |

OTHER PUBLICATIONS

Chapman/Leonard Studio Equipment Inc.; Apr. 2003 Equipment Catalog, pp. 112, 113, 120, 121 (2003).
J.L. Fisher Inc.; Motion Picture & Television Equipment Catalog; pp. 8, 9, 18 (2001).

* cited by examiner

*Primary Examiner*—Christopher Mahoney
(74) *Attorney, Agent, or Firm*—Perkins Coie LLP (57) ABSTRACT

A camera riser has a centering ring that engages an inner surface or diameter of the raised ring on a camera head. As a result, camera riser can automatically and securely center most camera heads. This saves time in setting up the camera. Even if the castle ring holding the camera head onto the camera riser becomes loose, the camera head remains centered on the head. The centering ring may also be used to center two or more risers joined together.

16 Claims, 10 Drawing Sheets

CAMERA RISER WITH UNIVERSAL CENTERING RING

The field of the invention is mounting fittings and attachments for attaching a camera onto a camera support.

Cameras are often supported on camera cranes, dollies, pedestals, tripods, and similar supports. These types of supports hold the weight of the camera and lenses, and allow the camera to be accurately and repeatably aimed or moved. Moving supports such as camera cranes and dollies allow the camera to be moved smoothly, while following actors or action scenes.

Camera heads are specialized types of camera supports. Generally, in use, camera heads are supported on a camera crane of dolly arm, or other support. Camera heads allow the camera to be moved or pivoted in two or three axes. For example, a typical three axis camera head allows the camera to move in the tilt, pan and roll (or "dutch") axes. So called "gear" camera heads have hand cranks or wheels for controlling head movements. Remote camera heads have motors to allow the camera to be remotely maneuvered. Fluid camera heads have fluid filled couplings, to provide smooth and vibration dampened movements. Camera heads from Weaver Steadman, Cartoni, Ari, Panavision, Ronford-Baker, and Chapman, are well known in the motion picture/video/television industry.

Camera risers are structural components often used to raise, lower, or extend the position of a camera head. In general, one or more risers is attached to the crane or dolly arm (or to a fixed support, such as a tripod). A camera head is then attached to the riser. In addition to holding the camera head, and the camera, at a desired location, risers may also be used to hold the camera head away from surrounding crane or dolly structures or components, to provide clearance for the head to move as needed during filming.

A long standing problem in the motion picture industry has been the mounting and centering of camera heads on camera supports. Typically, a large diameter (e.g., 2¾ inch) threaded section or stud projecting from the base or mounting plate of the camera head is simply positioned through a clearance hole in a riser or other support. Since the hole is a clearance hole, the head can be securely attached, yet still not be centered. A castle ring or nut is then tightened down on the threaded section. Centering the head on the riser, is done by eye, if at all, relying primarily on the very limited centering function provided by the clearance hole. Of course, the accuracy of centering in this way depends in part on the skill of the technician or dolly grip setting up the camera. In addition, centering in this way can be time consuming, since it can be essentially a trial and error operation. Since production time in the motion picture industry is very costly, even small time saving improvements can be important.

Centering the head on the riser is important for several reasons. If the head is not centered, camera lens angles may be misaligned. With some heads, the balance of the camera/head/dolly or crane arm setup can be thrown off if the head is not centered. This can make camera movements slower and more difficult. In other set ups, an eccentrically attached head may not perform as expected. In addition, with current heads and risers, whatever centering is achieved at the offset can be lost if the castle ring becomes loose. This can occur during abrupt panning movements, or if the castle ring is not tight to begin with.

Accordingly, there is need for improved ways to mounting and centering camera heads (and similar accessories) on a riser or other support.

SUMMARY OF THE INVENTION

It has now been discovered that most camera heads have a common feature among them allowing them to be centered on a single universal riser. Surprisingly, most camera heads have a raised or projecting ring, having the same inner diameter. With this realization, a new camera riser is provided with a centering ring that engages an inner surface or diameter of the raised ring. As a result, the present new camera riser can automatically and securely center most camera heads. This speeds up the centering installation.

BRIEF DESCRIPTION OF THE DRAWINGS

In the drawings, wherein the same reference number indicates the same element, in each of the views.

DETAILED DESCRIPTION OF THE DRAWINGS

Figure 1:
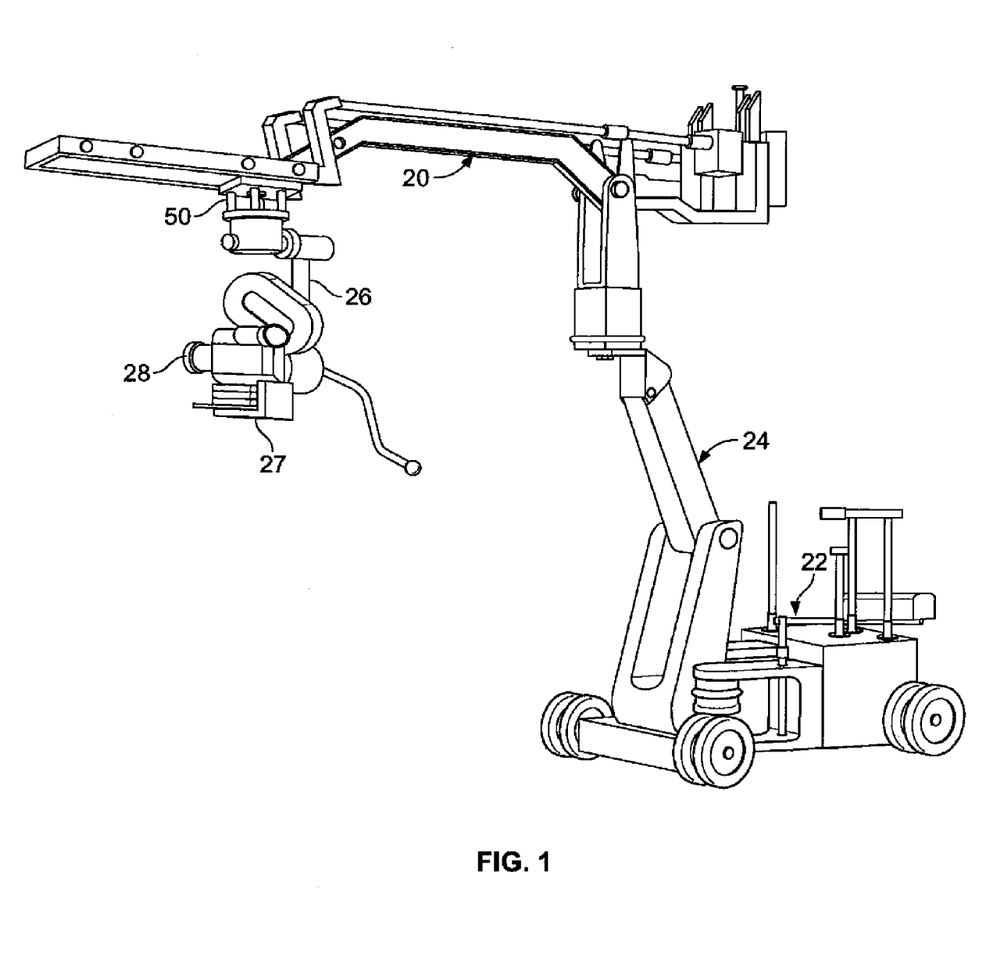
FIG. 1 is a perspective view of a motion picture camera attached to a riser on a crane arm supported on a camera dolly.

FIG. 1 shows an example of one use of the present camera riser or support. In FIG. 1 a camera 28 is supported on a camera platform 27 on a camera head 26 attached to a riser 50 on a crane arm 20. The crane arm 20 is held on the arm 24 of a camera dolly 22.

Figure 2:
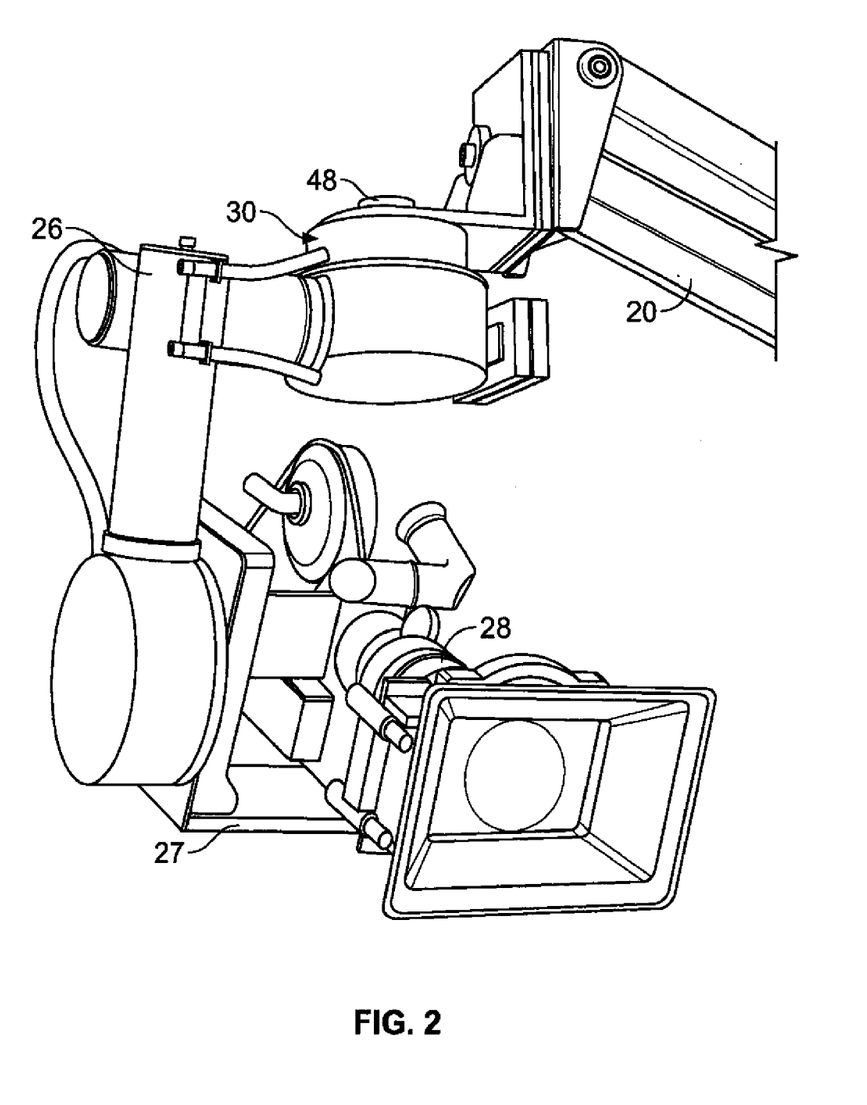
FIG. 2 is an enlarged perspective view of the camera and camera head shown in FIG. 1 The particular head shown is a Weaver Steadman remote head, commonly used in making video or motion picture productions.

FIG. 2 shows the camera head 26 (here supported on an L-bracket on a dolly arm, in an under-slung configuration. The camera head 26, like virtually all camera heads, has a mounting fitting 30 used to attach the camera head onto a support. A support here means a crane arm, a dolly arm, a tripod, (with or without one or more intermediate fittings between them and the head) or other similar supporting device or structure. FIGS. 1 and 2 show a Weaver Steadman head.

Figures 3, 4:
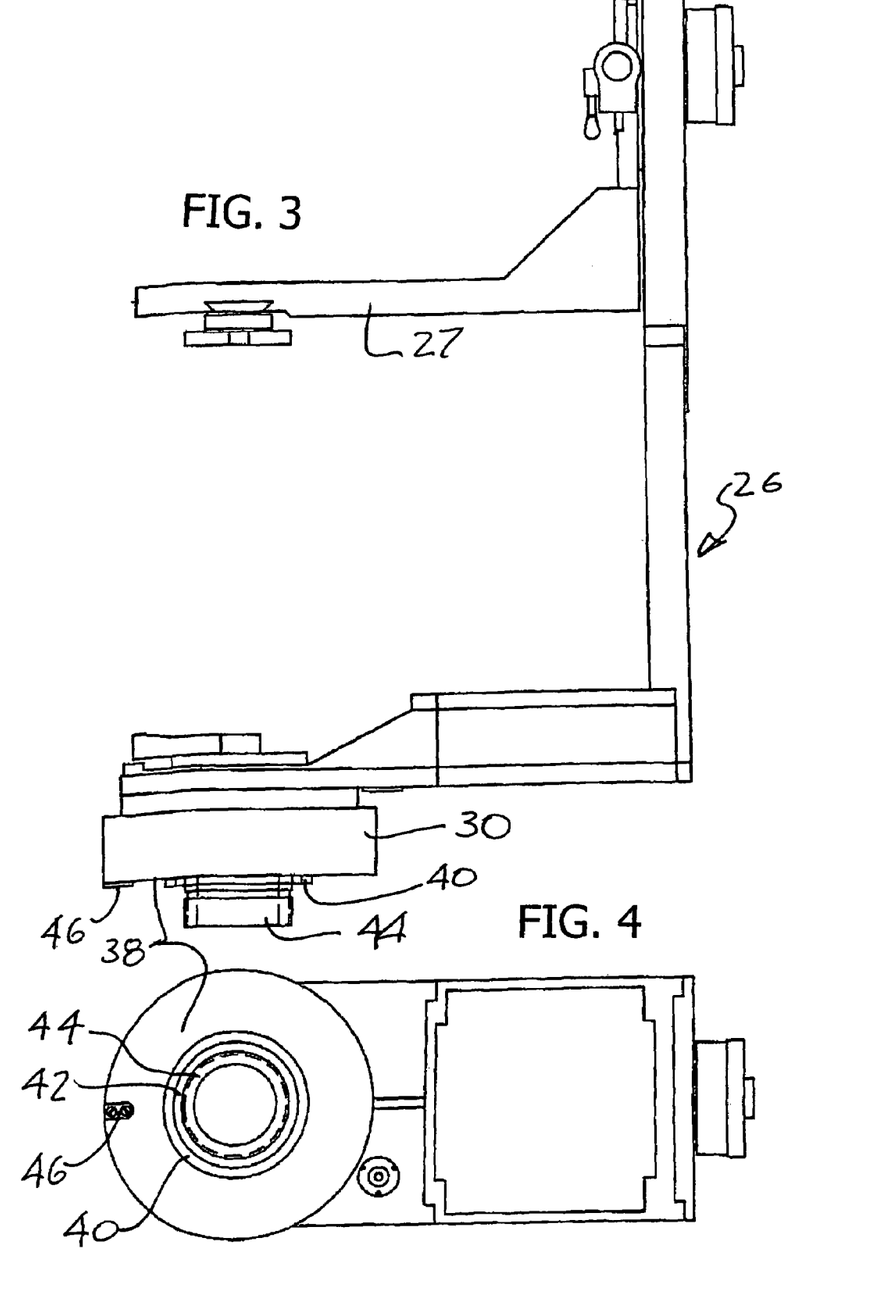
FIG. 3 is a side view of a Ronford-Baker Fluid 7 head.
FIG. 4 is a bottom view of the camera head shown in FIG. 3

FIGS. 3 and 4 show a Ronford-Baker head. The specific type of head used is generally not significant, other than to show that the present riser can be universally used with almost any camera head in the motion picture, television or video industries. Accordingly, the Weaver Steadman head shown in FIGS. 1 and 2 and the Ronford-Baker head shown in the other Figures are both generically indicated without distinction by element number 26. The term head or camera head here means any device or assembly used to aim a camera, in two or three axes of movement. The term riser or camera riser here means any structural component or accessory used between a camera support and a camera head, or even the camera itself.

Figure 5:
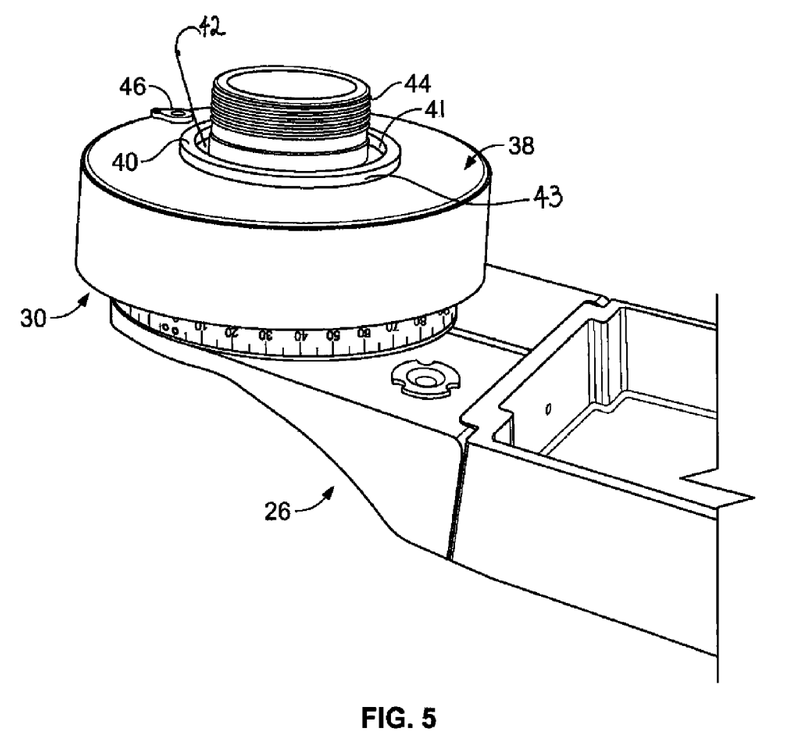
FIG. 5 is a bottom perspective view of the camera head of FIGS. 3 and 4, and showing the mounting fitting used to attach the head to a riser.

As shown in FIG. 3, the mounting fitting 30 of the head 26 has a threaded tube or stud 44 extending out from the bottom of the head. Referring also to FIGS. 4 and 5, a raised ring 40 extends up or outwardly from a flat or land area 38. As shown in FIG. 5, the raised ring 40 is spaced apart from the stud 44 by a groove 42. The raised ring 40 has an inner wall 41 facing the stud 44, and an outer wall 43. The walls 41 and 43 are generally vertical, i.e., they are generally perpendicular to the plane of the land area 38. The land area 38 surrounds the raised ring 40, out to the perimeter of the mounting fitting. A key 46 projects up slightly from the flat area 38 near the outer edge of the mounting fitting 30. The key fits into a slot in the riser 50, to lock the head into a fixed pan angle or azimuth position. FIG. 5 shows the head 26 in an inverted or upside down orientation.

Among the various commonly used heads (Weaver Steadman, Rondford-Baker, Cartoni, Chapman, O'Conner, Ari, Panavision, etc.), the diameter of the outer wall or surface 43 varies, with typical dimension ranging between about 3 to 4¼ inches. Accordingly, the outer wall of the raised ring cannot be used for centering a head.

Figure 6:
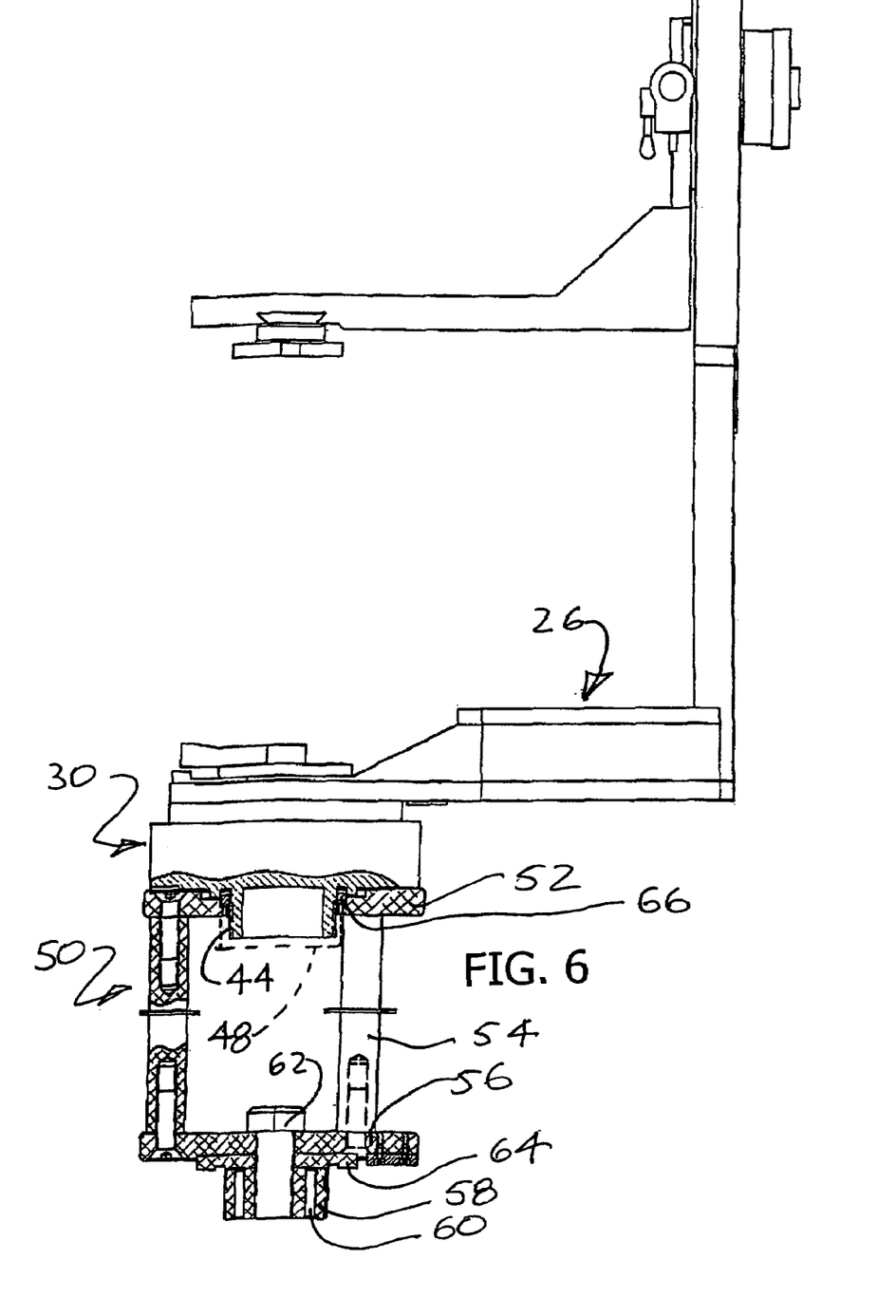
FIG. 6 is a side view showing the head of FIGS. 3-5 mounted on the present camera riser.
Figure 7:
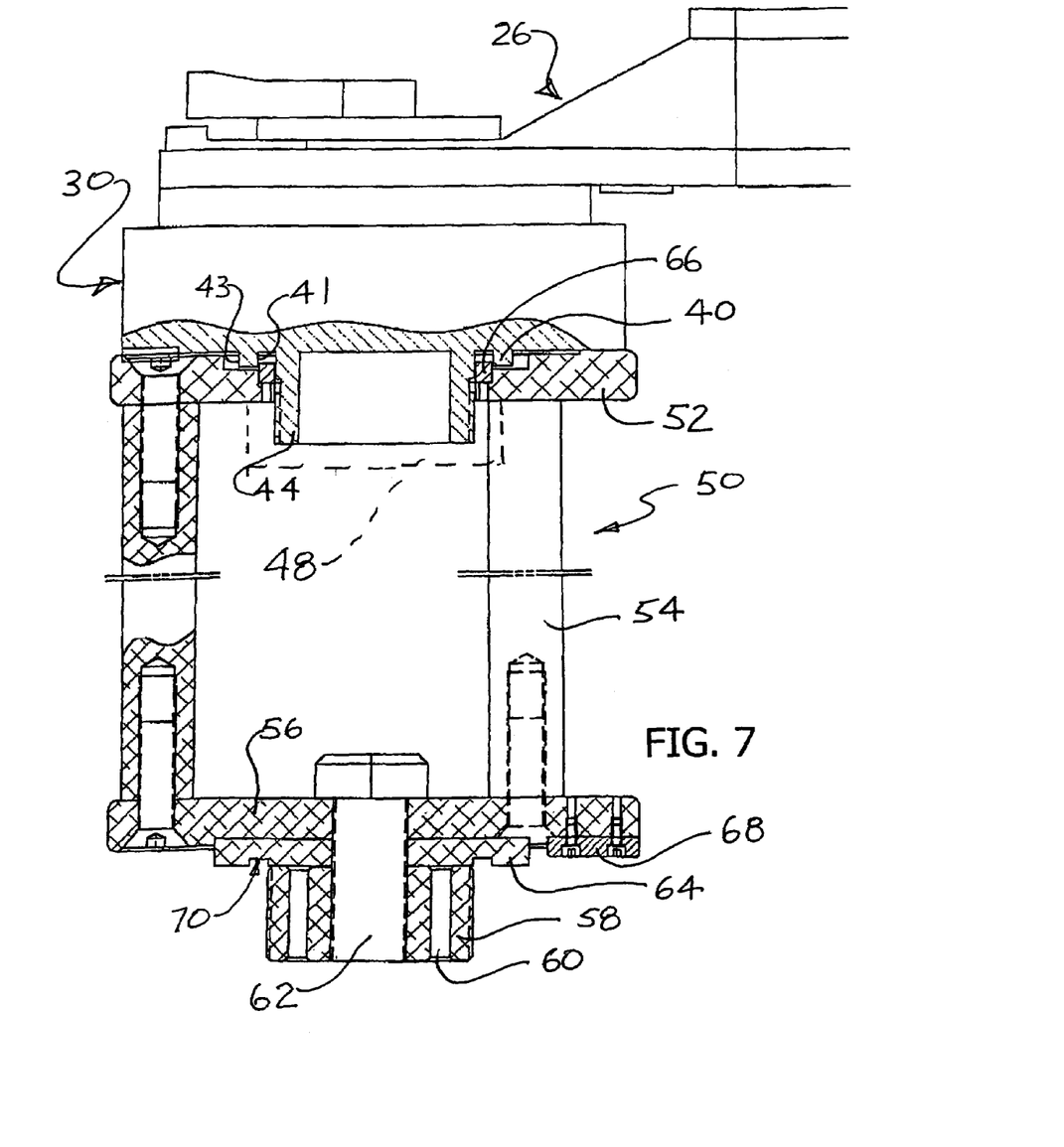
FIG. 7 is an enlarged detail view better showing the attachment of the head and riser in FIG. 6.
Figure 8:
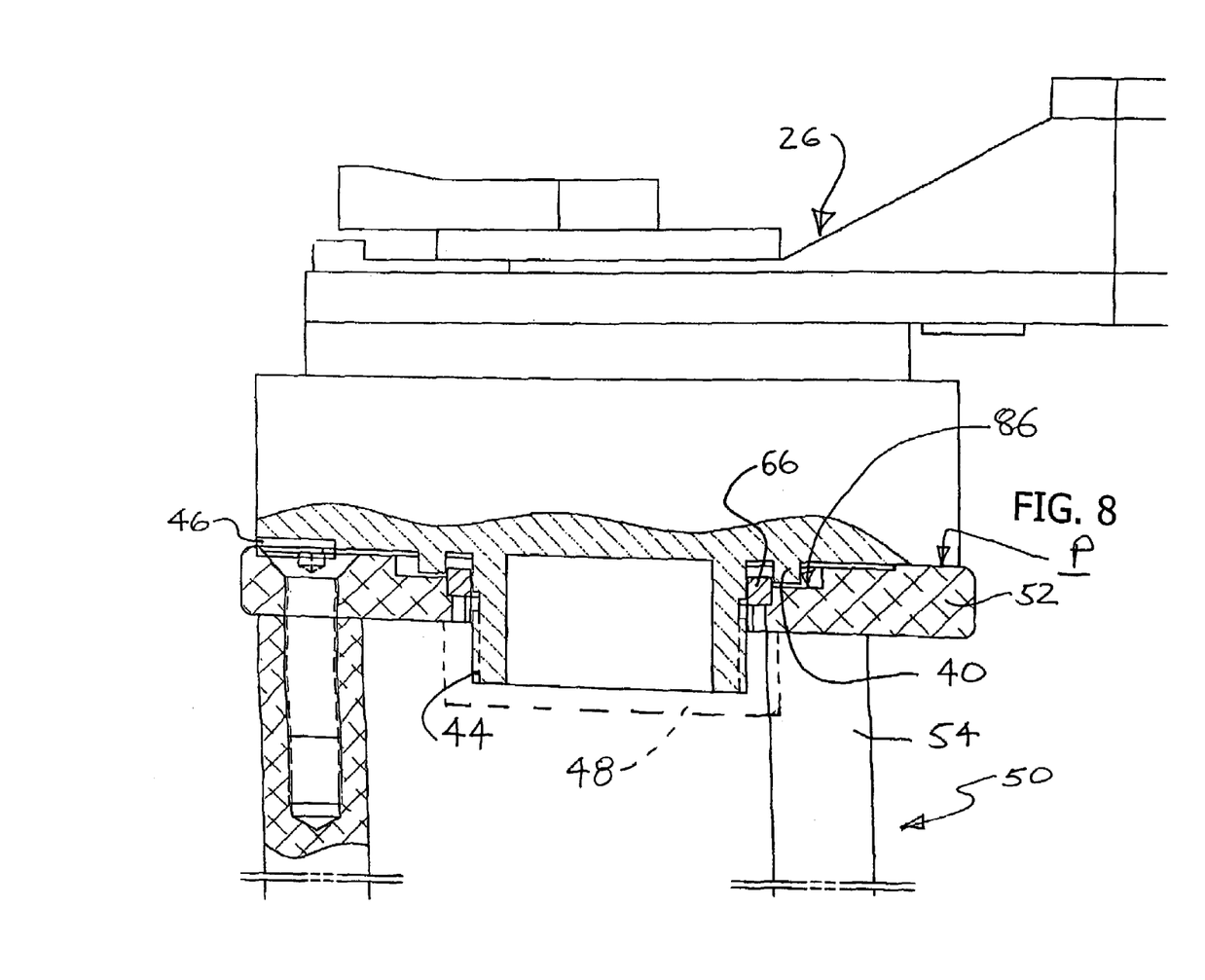
FIG. 8 is a still further enlarged view of the attachment.
Figure 10:
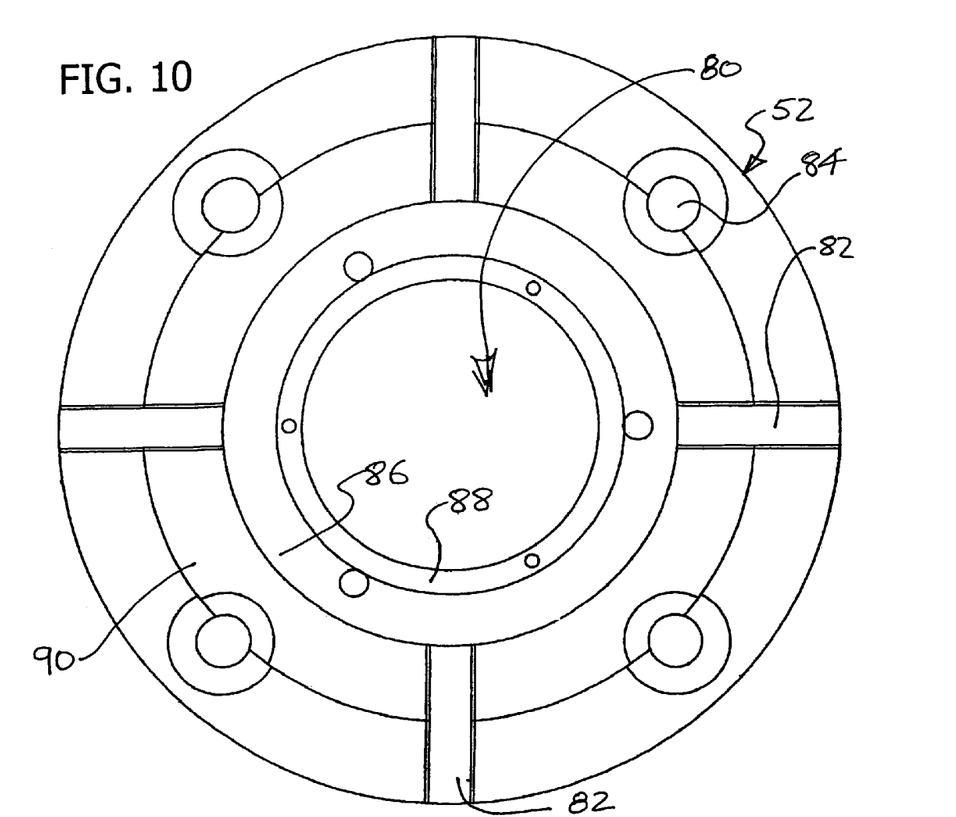
FIG. 10 is a top view of the upper plate of the riser shown in FIGS. 6-9.
Figure 11:
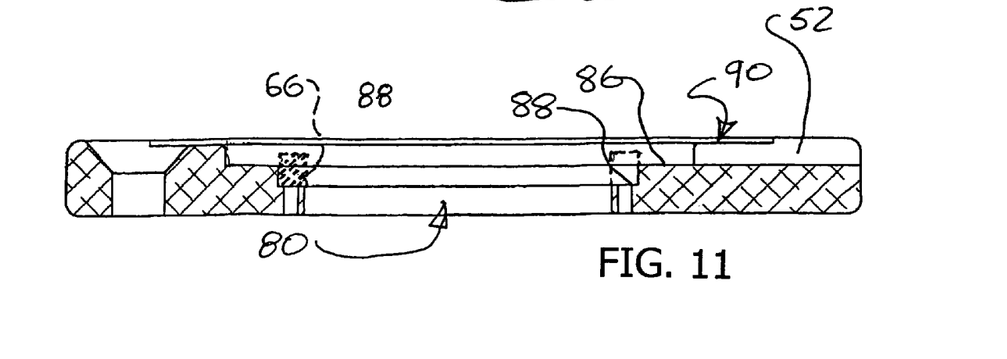
FIG. 11 is a partial section view of the upper plate shown in FIG. 10.

Referring to FIG. 5, it has now been discovered that, notwithstanding the variations in dimensions of the outer wall or surface 43, the inner wall or surface 41 on most heads 26 have a common dimension of 3¼ inches. As a result, the present riser is provided with a centering ring 66 that engages or aligns with the inner wall 41 of the raised ring 40 on the head 26. As shown in FIGS. 6, 7 and 8, the riser 50 has an upper or top plate 52 attached to a bottom or lower plate 56 with posts 54. Referring now also to FIGS. 10 and 11, the upper plate 52 has a central clearance opening 80 which the mounting stud 44 of the head 26 passes through. The top plate 52 has three counter bore or annular groove areas surrounding the clearance opening 80, i.e., a centering ring groove 88, a middle or raised ring receiving groove 86, and an outer groove or area 90. The top plate 52 also has keyway slots 82 and openings for fasteners or bolts 82 securing the posts 54 to the top plate 52.

The centering ring 66 is pressed into the centering ring groove 88. Existing risers that do not have any centering ring 66 or centering ring groove 88 may be reworked and converted into the present more universal riser by counterboring a centering ring groove 88, and then pressing in a 3¼ inch centering ring 66. Alternatively, if new top plates 52 are to be made, the centering ring may be machined or cast into the plate 52, as an integral feature. The centering ring may have a chamfered, angled, or rounded top surface.

Figure 9:
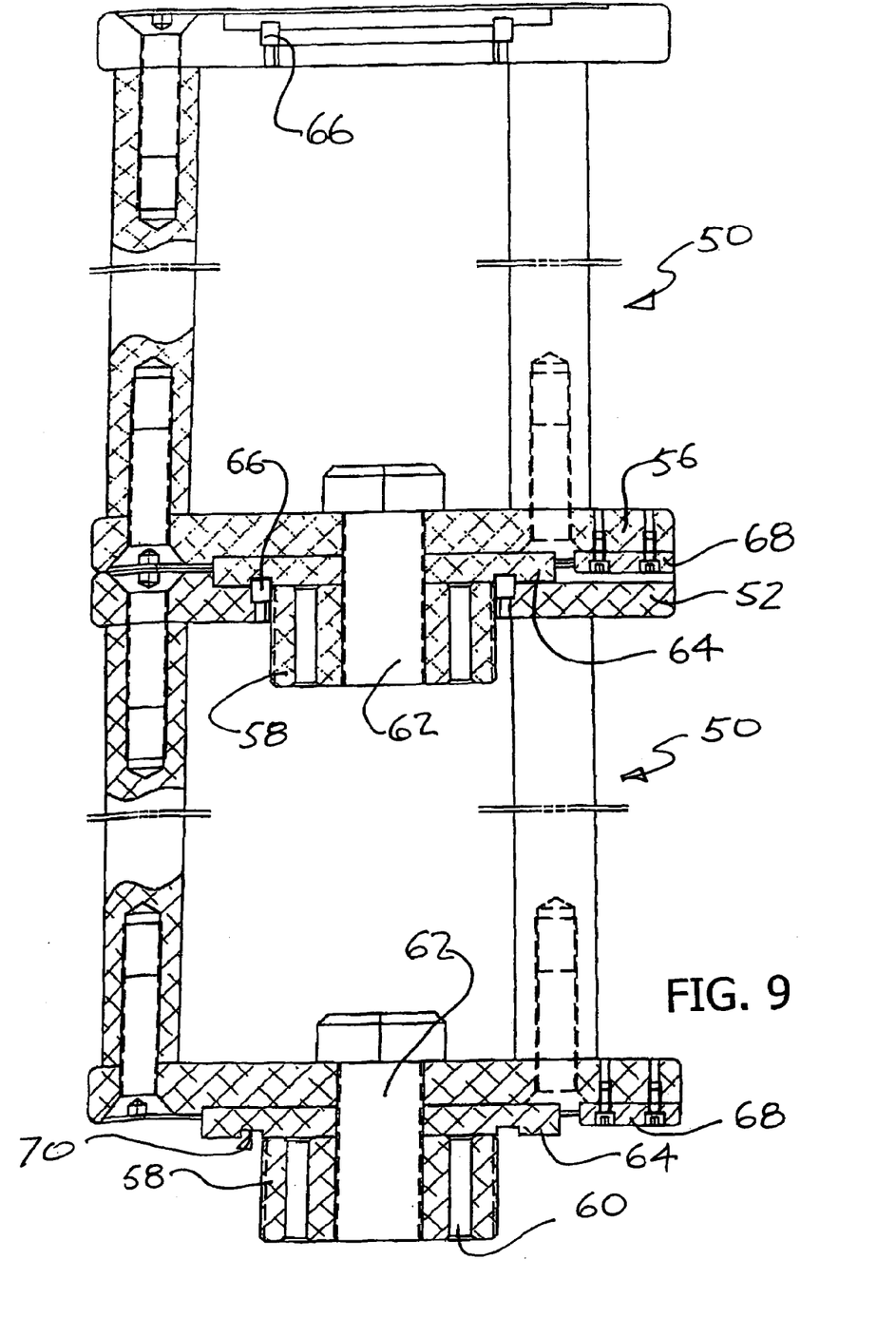
FIG. 9 is a side view, in part section, of two the risers shown in FIGS. 6-8 attached to each other, and demonstrating that two or more of the present risers may also be centered and attached together, to form a taller riser accessory.
Figure 12:
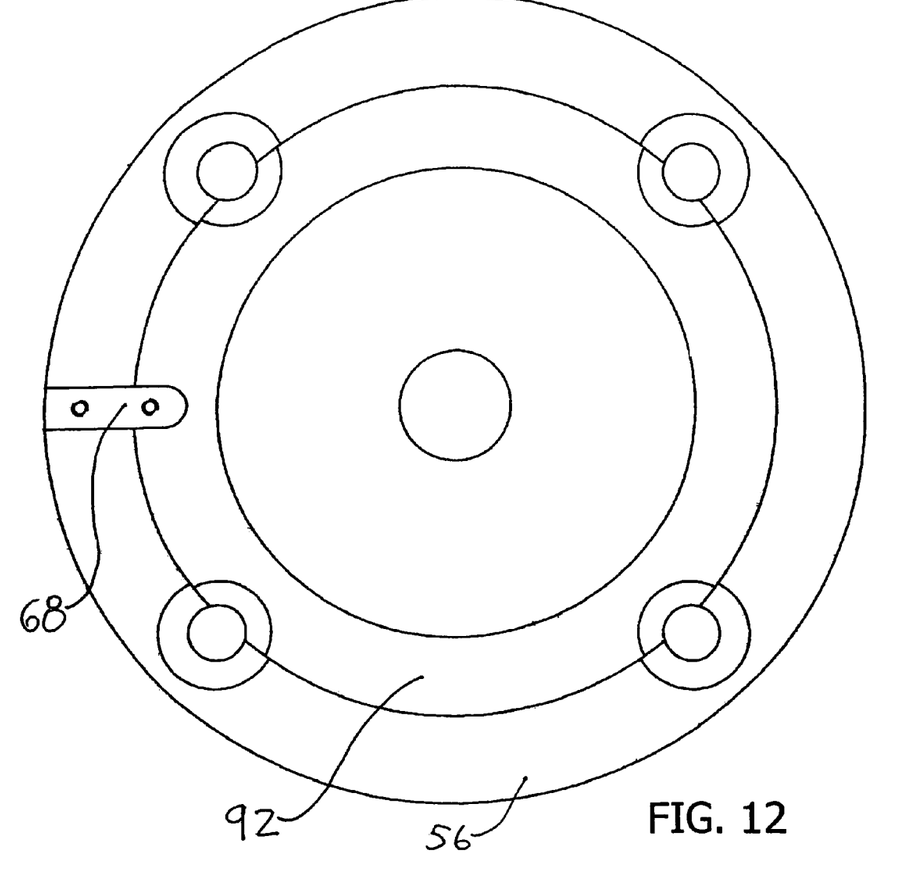
FIG. 12 is a top view of the lower plate of the riser shown in FIGS. 6-9.
Figure 13:
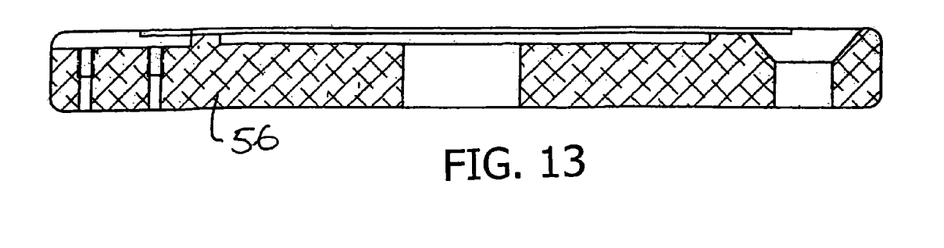
FIG. 13 is a section view of the lower plate shown in FIG. 12.

As shown in FIG. 7, a bolt 62 passes through a central clearance hole in the bottom plate 56. A ring plate 64 is clamped against the bottom surface of the lower plate 56 by a sleeve or stud section 58 threaded onto the bolt 62. The sleeve 58 has inner threads that engage with the bolt 62, an it also has outer threads for engagement with a castle nut or other threaded fastener. Spanner openings 60 allow the sleeve to be tightened onto the bolt 62. The ring plate 64 has a ring groove 70 dimensioned to center on a second or another head 26, as shown in FIG. 9, with the top head centered 26 to be mounted on another head 26, as shown in FIG. 9, with the top head centered on the head underneath. The ring groove 70 may alternatively be machined or cast or otherwise manufactured as an integral feature of the lower plate. The lower plate 56 has a recess 92, as shown in FIG. 12, with the ring plate partially set into the recess. A key 68 is attached to the bottom surface of the lower plate, and fits into a keyway slot 82 in an upper plate of an adjoining riser 50, forming the structure shown in FIG. 9.

Referring back to FIGS. 7 and 8, a head 26 is installed on the riser 50 by placing the tube or stud 44 of the head through the clearance opening 80 of the riser. As the mounting fitting 30 of the head is brought down into contact with the top plate 52 of the riser 50, the centering ring 66 engages against the inner wall or surface 41 of the raised ring 40. This automatically centers the head on the riser. A castle ring 48 is then screwed onto the stud 44, as shown in dotted lines in FIG. 6. This secures the head 26 onto the riser 50. As also shown in FIG. 8, the raised ring 40 extends down into the middle groove 86, but preferably does not touch or bottom out on it. Primary contact between the head and the upper plate 52 of the riser 50 is made adjacent to the outer perimeter of the mounting fitting 30 and the upper plate 52 (in the area marked P in FIG. 8), to better resist moments and compression forces. The centering ring 66 acts primarily radially, to provide centering between the head and the riser. The height of the centering ring is selected so that the centering ring does not bottom out in the groove 42, as shown in FIGS. 7 and 8.

The centering ring 66 is advantageously made as a permanent part of the riser, so that the centering feature is built into the riser. The concept of the centering ring 66 engaging the inner wall 41 can be used on various types of risers and other accessories the drawings show but one example of a riser, while many many other equivalent designs may also be used. The keys 46 and keyway slots 82 are used to precisely align the camera support, the riser(s), and the head, as is well known in the field. The keys and keyways are optional and may be omitted.

Thus a novel camera head mounting attachment has been shown and described. Various changes and substitutions may of course be made without departing from the spirit and scope of the invention. The invention, therefore, should not be limited, except to the following claims, and their equivalents.

The invention claimed is:

1. Apparatus for supporting a camera, comprising:
   a camera crane or dolly;
   a camera riser attached to the camera crane or dolly;
   a camera head attached to the camera riser;
   with the camera riser having an upper plate with a clearance hole for receiving a mounting stud of the camera head, and with the camera head having a raised ring having an inner surface and an outer surface; and
   a first centering ring on the upper plate positioned to engage the inner surface of the raised ring on the camera head, to center the camera head on the camera riser.

2. The apparatus of claim 1 wherein the centering ring is pressed into the upper plate.

3. The apparatus of claim 1 wherein the centering ring is formed integral with the upper plate.

4. The apparatus of claim 1 wherein the centering ring is concentric with the clearance hole.

5. The apparatus of claim 1 with the camera riser having a base plate area having a first diameter recessed into the upper plate by a first dimension, and having a outer counter bore area of a second diameter, less than the first diameter, and recessed into the upper plate by a second dimension greater than the first dimension, and with the base plate area and the outer counter bore area concentric with the centering ring.

6. The apparatus of 1 further comprising a lower plate joined to the upper plate, and a ring plate associated with the lower plate, with the ring plate having a ring groove dimensioned to receive a second centering ring having the same dimensions as the centering ring.

7. The camera riser of claim 1 further comprising a lower plate attached to the upper plate, with the lower plate having a groove dimensioned to receive a second centering ring having the same dimensions as the first centering ring.

8. The apparatus of claim 7 further comprising a lower plate attached to the upper plate, with the lower plate having groove dimensioned to receive a second centering ring having the same dimensions as the first centering ring.

9. A method for attaching a camera head to a riser, comprising the steps of:
  placing the camera head onto the riser;
  engaging an inner wall of a raised or projecting ring on the camera head with a centering ring projecting up from the head, to center the head on the riser;
  securing the head onto the riser by threading a fastener onto a mounting stud of the head projecting into the riser; and
  aligning a key on the head with a keyway slot on the head, to orient the head at a known angle relative to the head.

10. A method for retrofitting a camera riser to allow various different camera heads to be mounted on the camera riser, and to be centered on the camera riser, without using adapter components, comprising:
  making a counter bore in a top plate of the camera riser, concentric with the through opening in the top plate;
  pressing a centering ring into the counter bore, to a depth so that the centering projects partially from the counter bore, and with the centering ring having an outer diameter dimensioned to engage with an inner wall on raised ring of a camera head.

11. A camera riser comprising:
  an upper plate having:
    a clearance hole for receiving a mounting stud of a camera head;
    a centering ring, concentric with the clearance hole;
    a raised head ring receiving groove surrounding and concentric with the centering ring; and
    an outer grooves surrounding and concentric with the raised head ring receiving groove; and
  a lower plate attached to and spaced apart from the upper plate, and with the lower plate having a ring groove dimensioned to receive a centering ring.

12. In a camera riser of the type having an upper plate with a clearance hole for receiving a mounting stud of a camera head, and with the camera head having a raised ring having an inner surface and an outer surface, the improvement comprising:
  a first centering ring on the upper plate positioned to engage the inner surface of the raised ring on the camera head, to center the camera head on the camera riser;
  with the camera riser having a base plate area having a first diameter recessed into the upper plate by a first dimension, and having an outer counter bore area of a second diameter, less than the first diameter, and recessed into the upper plate by a second dimension greater than the first dimension, and with the base plate area and the outer counter bore area concentric with the centering ring.

13. A camera riser comprising:
  an upper plate with a clearance hole for receiving a mounting stud of a camera head, and with the camera head having a raised ring having an inner surface and an outer surface;
  a first centering ring on the upper plate positioned to engage the inner surface of the raised ring on the camera head, to center the camera head on the riser; and
  a lower plate joined to the upper plate, and a ring plate associated with the lower plate, with the ring plate having a ring groove dimensioned to receive a second centering ring having the same dimensions as the centering ring.

14. The camera riser of claim 13 wherein the ring plate is made integral with or part of the lower plate.

15. The camera riser of claim 13 wherein the ring plate is pressed into the lower plate.

16. A camera riser comprising:
  an upper plate with a clearance hole for receiving a mounting stud of a camera head, with the camera head having a raised ring having an inner surface and an outer surface,
  a first centering ring on the upper plate positioned to engage the inner surface of the raised ring on the camera head, to center the camera head on the riser,
  a lower plate attached to the upper plate with a plurality of posts, with the lower plate having a groove dimensioned to receive a second centering ring having substantially the same dimensions as the first centering ring.

* * * * *